United States Patent
Tanaka

(10) Patent No.: US 11,162,434 B2
(45) Date of Patent: Nov. 2, 2021

(54) THROTTLE DEVICE

(71) Applicant: MIKUNI CORPORATION, Tokyo (JP)

(72) Inventor: Isamu Tanaka, Odawara (JP)

(73) Assignee: MIKUNI COPORATION, Tokyo (JP)

(*) Notice: Subject to any disclaimer, the term of this patent is extended or adjusted under 35 U.S.C. 154(b) by 0 days.

(21) Appl. No.: 16/951,146

(22) Filed: Nov. 18, 2020

(65) Prior Publication Data
US 2021/0172386 A1 Jun. 10, 2021

(30) Foreign Application Priority Data

Dec. 4, 2019 (JP) .............................. JP2019-219688
Dec. 4, 2019 (JP) .............................. JP2019-219689
Dec. 4, 2019 (JP) .............................. JP2019-219690

(51) Int. Cl.
F02D 9/10 (2006.01)
F02D 13/06 (2006.01)
(Continued)

(52) U.S. Cl.
CPC ............. F02D 9/1065 (2013.01); F02D 9/10 (2013.01); F02D 11/10 (2013.01); F02D 13/06 (2013.01); F02D 17/02 (2013.01); F02D 41/0002 (2013.01); F02D 41/008 (2013.01); F02D 41/0087 (2013.01); F02D 9/105 (2013.01); F02D 2011/101 (2013.01); F02D 2041/0012 (2013.01)

(58) Field of Classification Search
CPC ........ F02D 9/1065; F02D 9/105; F02D 13/06; F02D 41/0002; F02D 41/008; F02D 41/0087

USPC ........................................................ 123/336
See application file for complete search history.

(56) References Cited

U.S. PATENT DOCUMENTS 6,516,254 B1 * 2/2003 Wakashiro ............. B60K 6/543
                                                        701/22
7,066,142 B2 * 6/2006 Hanasato ............... F02D 9/1095
                                                        123/336
(Continued)

FOREIGN PATENT DOCUMENTS

DE 102017222694 6/2019
EP 1548252 6/2005
(Continued)

OTHER PUBLICATIONS

Extended European Search Report, dated Apr. 21, 2021, in corresponding European Application No. 20211195.1 (9 pp.).

Primary Examiner — Mahmoud Gimie

(57) ABSTRACT

Provided is a throttle device including a total of two throttle units in each two cylinders in an engine 1, each of the throttle units having a unit body having intake air passages corresponding to four cylinders of the engine, a throttle shaft rotatably supported by the unit body, throttle valves secured to the throttle shaft to open and close the intake air passages for the cylinders, a motor, and a deceleration mechanism decelerating rotation of a drive shaft of the motor and transmitting the decelerated rotation to the throttle shaft, in which a deceleration ratio of the deceleration mechanism provided in a first throttle unit and a deceleration ratio of the deceleration mechanism provided in a second throttle unit out of the two throttle units are different from each other.

8 Claims, 9 Drawing Sheets

(51) Int. Cl.
*F02D 17/02* (2006.01)
*F02D 41/00* (2006.01)
*F02D 11/10* (2006.01)

(56) References Cited

U.S. PATENT DOCUMENTS

| | | | |
|---|---|---|---|
| 2004/0259683 A1* | 12/2004 | Katakura | F02D 17/02 |
| | | | 477/111 |
| 2005/0133004 A1* | 6/2005 | Maehara | F02D 9/1065 |
| | | | 123/336 |
| 2007/0039586 A1 | 2/2007 | Maehara et al. | |
| 2008/0230034 A1 | 9/2008 | Dunn | |
| 2016/0160763 A1* | 6/2016 | Matsuda | B62K 11/00 |
| | | | 123/403 |

FOREIGN PATENT DOCUMENTS

| | | | | |
|---|---|---|---|---|
| JP | 2005-282463 A | | 10/2005 | |
| JP | 2006077587 A | * | 3/2006 | F02D 9/02 |

\* cited by examiner

THROTTLE DEVICE

CROSS-REFERENCE TO RELATED APPLICATIONS

This Application claims priority from Japanese Patent Application No. 2019-219688 filed on Dec. 4, 2019, Japanese Patent Application No. 2019-219689 filed on Dec. 4, 2019, and Japanese Patent Application No. 2019-219690 filed on Dec. 4, 2019, which are incorporated herein by reference in their entirety.

BACKGROUND OF THE INVENTION

Field of the Invention

The present invention relates to a throttle device controlling intake air of an engine.

Description of the Related Art

Many of engines mounted on vehicles such as motorcycles for driving the vehicles to travel have a plurality of cylinders to obtain high outputs. Further, multi-throttle devices that provide throttle valves for each of the plurality of cylinders have widely been employed in motorcycles to improve engine outputs.

For example, Japanese Patent Laid-Open No. 2005-282463 discloses an inline four-cylinder engine provided with a throttle valve in each of intake air passages of cylinders. The engine disclosed in the aforementioned document includes a motor to drive a throttle valve for a first cylinder and a throttle valve for a second cylinder, a motor to drive a throttle valve for a third cylinder, and a motor to drive a throttle valve for a fourth cylinder. This enables degrees of opening of the first cylinder, the second cylinder, the third cylinder, and the fourth cylinder to be individually controlled by controlling driving of each motor. Further, the engine disclosed in the aforementioned document includes a cylinder deactivated operation function of deactivating operations of a part (the third cylinder and the fourth cylinder) of the plurality of cylinders.

According to such an engine provided with throttle valves for each of cylinders and provided with a plurality of motors for driving the throttle valves as described above, cases in which degrees of opening of the throttle valves significantly differ from each other may occur due to the individual control of the driving of the motors. According to such an engine provided with the cylinder deactivated operation function as in the aforementioned document, throttle valves of the part of cylinders that are deactivated are set to have predetermined degrees of opening (in a closed state, for example) at the time of the cylinder deactivated operation, and the degree of opening of the throttle valves of the cylinders that are deactivated and of the cylinders that are not deactivated at the time of the cylinder deactivated operation may thus significantly differ from each other, for example.

There is a possibility that when it is attempted to control all the throttle valves to have the same target degree of opening, for example, from such a state in which the degrees of opening of the throttle valves significantly differ from each other in this manner, the difference in degree of opening of the throttle valves is not immediately solved at the time of shifting to the target degree of opening and a driver of the vehicle have an uncomfortable feeling due to a difference in outputs of the cylinders caused by the difference in degree of opening of the throttle valves.

SUMMARY OF THE INVENTION

An object of the present invention, which has made in view of such circumstances, is to provide a multi-throttle valve device that is employed in multi-cylinder engine and is capable of curbing an uncomfortable feeling due to a difference in outputs of the cylinders.

In order to achieve the aforementioned object, there is provided a throttle device according to the present invention including: a plurality of throttle units provided in an engine for each of cylinders or for each of cylinder groups, each of the throttle units including a throttle body having intake air passages corresponding to the plurality of cylinders of the engine, a throttle shaft rotatably supported by the throttle body, throttle valves secured to the throttle shaft to open and close the intake air passages for the cylinders, a motor, and a decelerator decelerating rotation of a drive shaft of the motor and transmitting the decelerated rotation to the throttle shaft, in which a deceleration ratio of the decelerator provided in the first throttle unit and a deceleration ratio of the decelerator provided in the second throttle unit out of the plurality of throttle units are different from each other.

According to the throttle device of the present invention, it is possible to set the opening/closing speeds of the throttle valve of the first throttle unit and of the throttle valve of the second throttle unit to be different from each other and thereby to immediately solve a difference in degree of opening of the throttle valves in a case in which the first motor and the second motor are driven to have the same predetermined degree of opening from a state in which the degrees of opening of the throttle valves are different from each other. It is thus possible to quickly solve a difference between an output of the cylinder, intake air of which is controlled by the first throttle unit, and an output of the cylinder, intake air of which is controlled by the second throttle unit, to obtain a smooth engine output, and to curb an uncomfortable feeling of a driver.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE INVENTION

Hereinafter, an embodiment of the present invention will be described on the basis of drawings.

Figure 1:
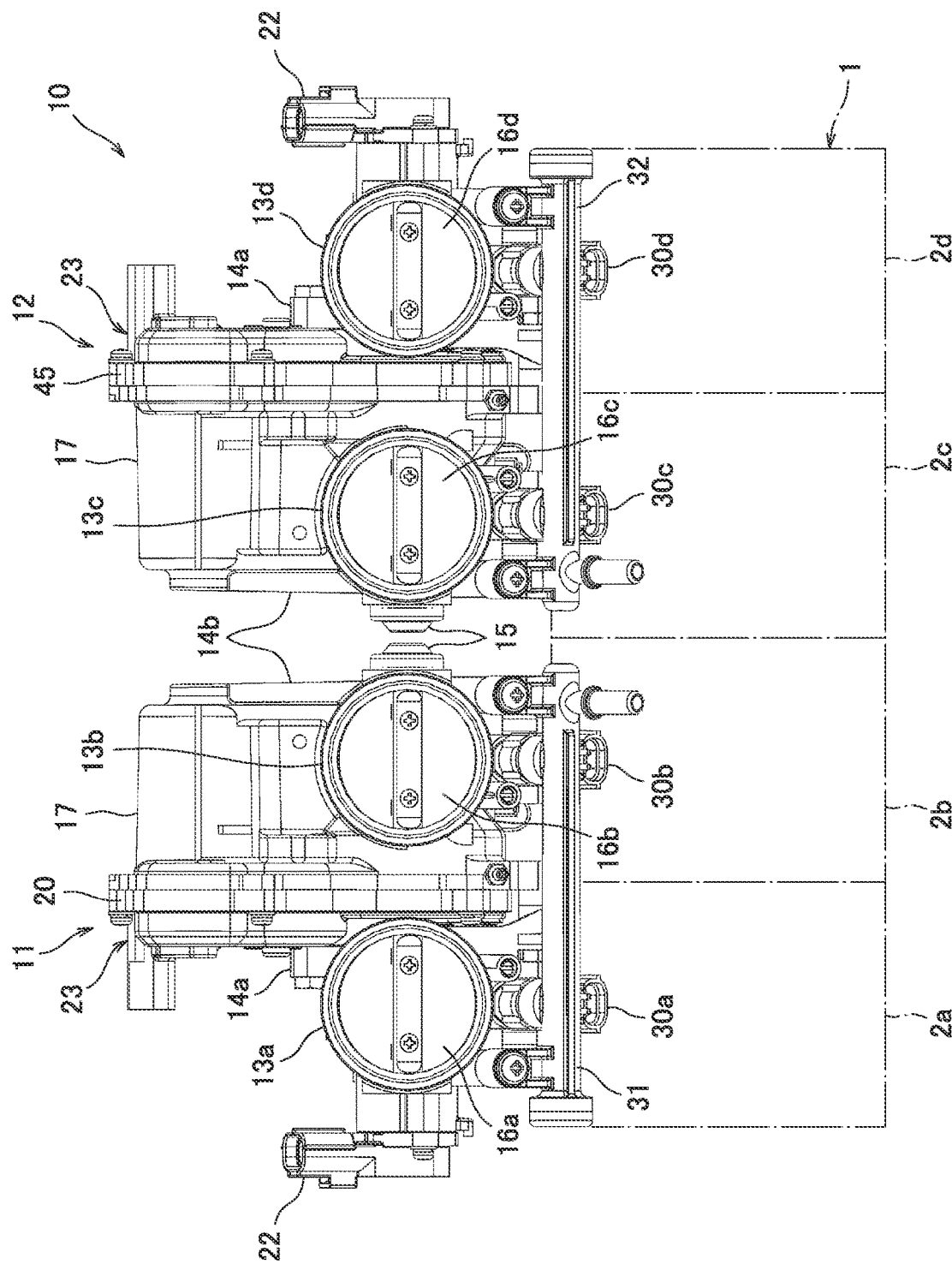
FIG. 1 is an external view of a throttle device according to an embodiment of the present invention.
Figure 2:
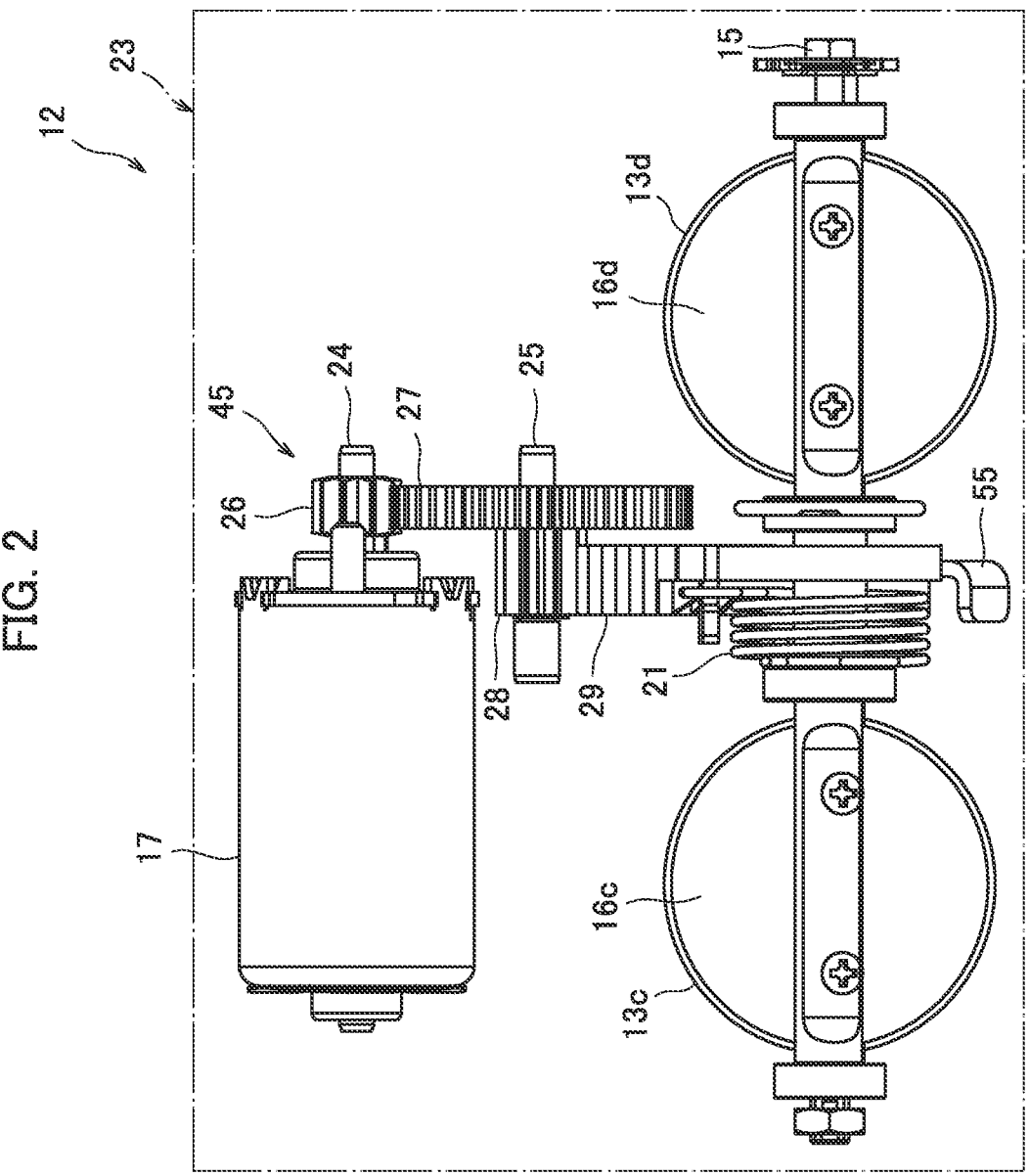
FIG. 2 is an overview configuration diagram of a throttle unit.
Figure 3:
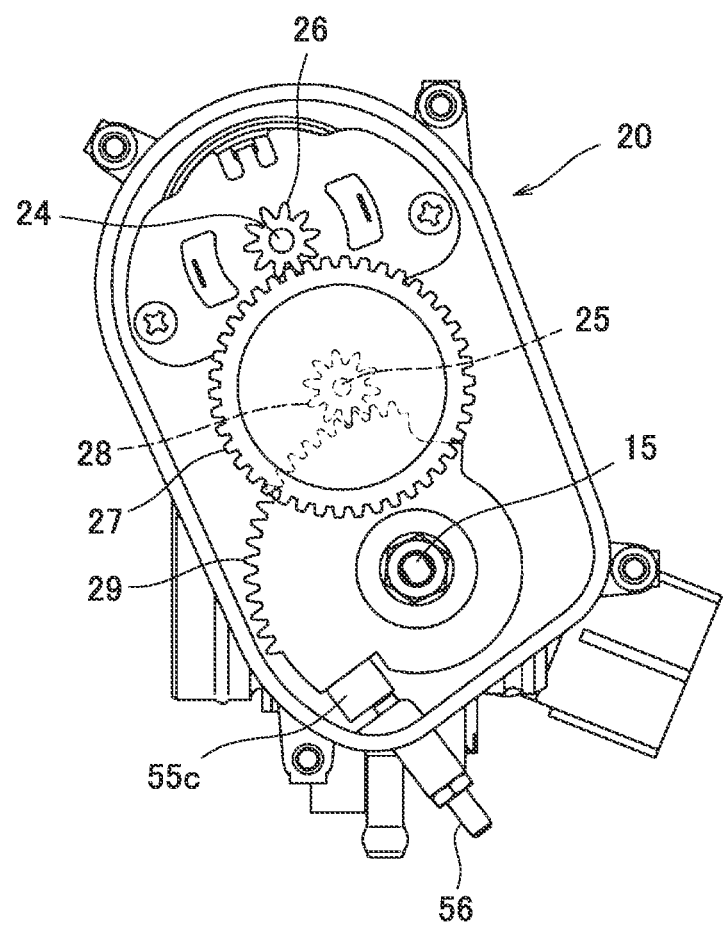
FIG. 3 is an internal structure diagram of a deceleration mechanism in a first throttle unit.
Figure 4:
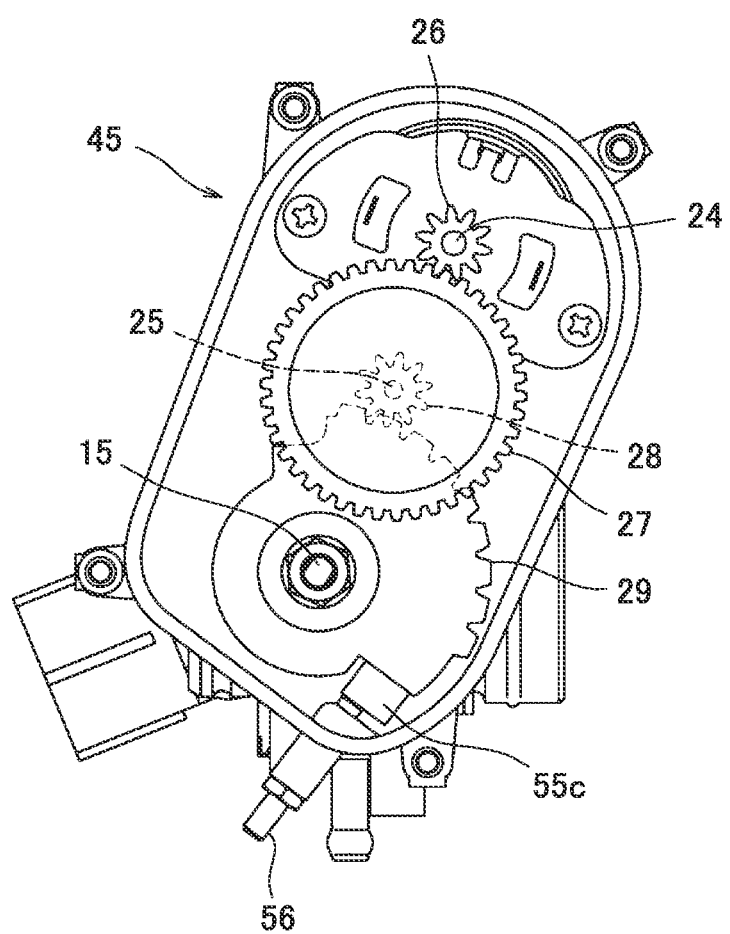
FIG. 4 is an internal structure diagram of a deceleration mechanism in a second throttle unit.

FIG. 1 is an exterior view of a throttle device 10 according to an embodiment of the present invention. FIG. 2 is an overview configuration diagram of a throttle unit (second throttle unit 12). FIG. 3 is an internal structure diagram of a deceleration mechanism 20 (decelerator) in a first throttle unit 11. FIG. 4 is an internal structure diagram of a deceleration mechanism 45 (decelerator) in the second throttle unit 12.

The throttle device 10 according to the present invention is a multi-throttle device attached to a multi-cylinder engine. The throttle device 10 according to this embodiment is employed in an inline four-cylinder engine 1 mounted on a vehicle such as a motorcycle. For the engine 1, four cylinders (2a, 2b, 2c, and 2d) from #1 to #4 are disposed to be aligned in a vehicle width direction (left-right direction) in the vehicle.

As illustrated in FIG. 1, the throttle device 10 has a first throttle unit 11 (throttle unit) for a #1 cylinder 2a and a #2 cylinder 2b disposed on one side of the engine 1 in the vehicle width direction and a second throttle unit 12 (throttle unit) for a #3 cylinder 2c and a #4 cylinder 2d disposed on the other side of the engine 1 in the vehicle width direction. The first throttle unit 11 and the second throttle unit 12 are disposed to be aligned on the left and right sides in the vehicle width direction.

The first throttle unit 11 and the second throttle unit 12 are configured to be symmetric on the left and right sides except for deceleration mechanisms 20 and 45, which will be described later.

The first throttle unit 11 includes a first segment body 14a in which an intake air passage 13a of the #1 cylinder 2a is formed and a second segment body 14b in which an intake air passage 13b of the #2 cylinder 2b is formed.

The second throttle unit 12 includes a second segment body 14b in which an intake air passage 13c of the #3 cylinder 2c is formed and a first segment body 14a in which an intake air passage 13d of the #4 cylinder 2d is formed.

As illustrated in FIGS. 1 and 2, each of the first throttle unit 11 and the second throttle unit 12 further includes a throttle shaft 15, throttle valves 16b to 16d, a motor 17 (motor), deceleration mechanisms 20 and 45, a return spring 21, and a throttle position sensor 22. Note that FIG. 2 illustrates the internal structure of the second throttle unit 12 and the intake air passage 13c is provided with the throttle valve 16c while the intake air passage 13d is provided with the throttle valve 16d. In the first throttle unit 11, the intake air passage 13a is provided with the throttle valve 16a while the intake air passage 13b is provided with the throttle valve 16b.

The first segment body 14a and the second segment body 14b are disposed to be aligned in the left-right direction (vehicle width direction) in accordance with the corresponding cylinders 2a to 2d to form a unit body 23 (throttle body).

The intake air passages 13a to 13d are formed to extend perpendicularly (in the front-back direction in FIGS. 1 and 2) to the left-right direction. The throttle shaft 15 extends in the vehicle width direction through the unit body 23, passes through the inside of the two intake air passages (13a and 13c or 13c and 13d), and is rotatably supported by the unit body 23.

The throttle valves 16a to 16d are disk-shaped members that have substantially the same diameter as the inner diameter of the intake air passages 13a to 13d, are secured to the throttle shaft 15, and are disposed inside the intake air passages 13a to 13d. The throttle valves 16a to 16d rotate inside the intake air passages 13a to 13d along with rotation of the throttle shaft 15 and can rotate at an arbitrary angle between a closed position at which the intake air passages 13a to 13d are closed and an opened position at which the intake air passages 13a to 13d are opened.

The motor 17 is an electric motor. The motor 17 is secured to the second segment body 14b in each of the throttle units 11 and 12 and is disposed such that a rotation drive shaft 24 is parallel to the throttle shaft 15.

The deceleration mechanisms 20 and 45 are disposed between the first segment body 14a and the second segment body 14b. As illustrated in FIGS. 3 and 4, the deceleration mechanisms 20 and 45 have an intermediate axis 25, a first gear 26 secured to the rotation drive shaft 24 of the motor 17, a second gear 27 secured to the intermediate axis 25 and engaged with the first gear 26, a third gear 28 secured to the intermediate axis 25, and a fourth gear 29 secured to the throttle shaft 15 and engaged with the third gear 28. The intermediate axis 25 is disposed to be parallel to the rotation drive shaft 24 and the throttle shaft 15 and is rotatably supported by the unit body 23.

The deceleration mechanisms 20 and 45 transmit the rotation of the rotation drive shaft 24 of the motor 17 to the first gear 26, the second gear 27, the intermediate axis 25, the third gear 28, and the fourth gear 29 in this order to decelerate the rotation and drive and rotate the throttle shaft 15.

The return spring 21 is a torsion spring disposed to be wound around the throttle shaft 15 several times and including one end portion supported by the unit body 23 and the other end portion supported by the throttle shaft 15. The return spring 21 biases the throttle shaft 15 to bring the throttle valves 16c and 16d into the closed state.

The throttle position sensor 22 is provided at the one end portion of the throttle shaft 15 and functions to detect the rotational angle of the throttle shaft 15. The throttle position sensor 22 is disposed in the first segment body 14a, for example.

As illustrated in FIG. 1, the second segment bodies 14b of the first throttle unit 11 and the second throttle unit 12 are disposed inward in the left-right direction, that is, the motor 17 (motor) of the first throttle unit 11 and the motor 17 (motor) of the second throttle unit 12 are disposed inward in the left-right direction, and the throttle position sensor 22 is disposed outward in the left-right direction, in the throttle device 10.

Also, the first throttle unit 11 includes fuel injection valves 30a and 30b injecting a fuel into the intake air passages 13a and 13b. The second throttle unit 12 includes fuel injection valves 30c and 30d injecting a fuel into the intake air passages 13a and 13b. In other words, the throttle device 10 includes a total of four fuel injection valves 30a to 30d corresponding to the cylinders 2a to 2d.

The fuel is supplied from a fuel pump, which is not illustrated, to the two fuel injection valves 30a and 30b included in the first throttle unit 11 via a fuel pipe 31. Also, the fuel is supplied from a fuel pump, which is not illustrated, to the two fuel injection valves 30c and 30d included in the second throttle unit 12 via a fuel pipe 32.

Figure 5:
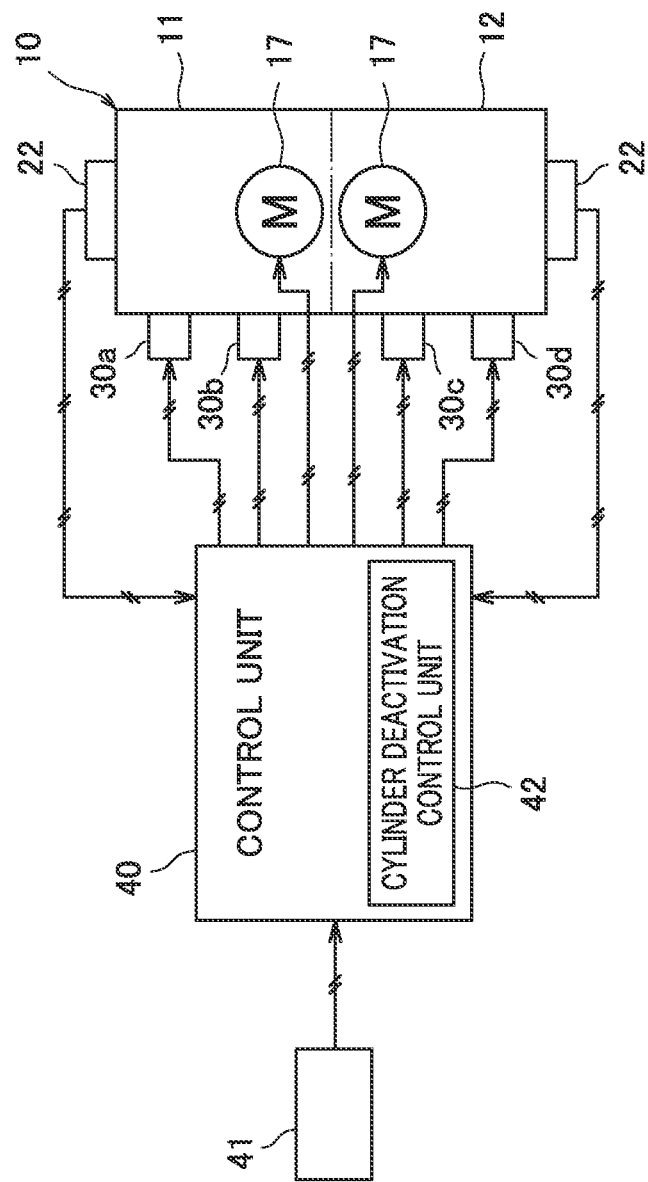
FIG. 5 is an electric circuit diagram for driving the throttle device.

FIG. 5 is an electric circuit diagram for driving the throttle device 10.

Driving of each of the motor 17 of the first throttle unit 11 and the motor 17 of the second throttle unit 12 in the throttle device 10 is controlled by the control unit 40.

The control unit 40 is a control device for controlling operations of the engine 1 and is configured to include an input/output device, a storage device (such as a ROM, a RAM, or a nonvolatile RAM), a central processing unit (CPU), and the like. The control unit 40 inputs a degree of opening of an accelerator detected by an accelerator opening degree sensor 41 provided in the vehicle, applies a predetermined voltage of the motor 17 of the first throttle unit 11 and the motor 17 of the second throttle unit 12, outputs a drive current, controls driving of each motor 17, and controls operations of each of the fuel injection valves 30a to 30d. At this time, the rotational angle of the throttle shaft 15 detected by the throttle position sensor 22 is input for each of the first throttle unit 11 and the second throttle unit 12, and feedback control is performed such that the rotational angle of the throttle shaft 15 is obtained in accordance with the degree of accelerator opening.

In addition, the control unit 40 includes a cylinder deactivation control unit 42 executing a cylinder deactivated operation.

The cylinder deactivation control unit 42 controls driving of the motor 17 such that the throttle valves 16c and 16d of the second throttle unit 12 are in a fully opened state (predetermined degree of opening) and stops injection of the fuel performed by the fuel injection valves 30c and 30d in a predetermined operating region of the engine 1, for example, at the time of a request for a low output to obtain a degree of accelerator opening of equal to or less than a predetermined value. Note that the operations of the motor 17 of the first throttle unit 11 and the fuel injection valves 30a and 30b are controlled in accordance with a requested output based on an accelerator operation or the like even in the predetermined operating region.

In this manner, the combustion in the two #3 and #4 cylinders 2c and 2d from among the four #1 to #4 cylinders 2a to 2d in the engine 1 is stopped and the output stops. Thus, since fuel consumption at the #3 and #4 cylinders 2c and 2d becomes zero, and the throttle valves 16c and 16d are brought into the fully opened state in the #3 and #4 cylinders 2c and 2d, it is possible to reduce a pumping loss and to curb fuel consumption in the entire engine 1.

In this embodiment, a deceleration ratio of the deceleration mechanism 20 in the first throttle unit 11 and a deceleration ratio of the deceleration mechanism 45 in the second throttle unit 12 are set to be different from each other.

As illustrated in FIGS. 3 and 4, a gear ratio of the third gear 28 and the fourth gear 29 of the deceleration mechanism 45 in the second throttle unit 12 is set to be lower than a gear ratio of the third gear 28 and the fourth gear 29 of the deceleration mechanism 20 in the first throttle unit 11. Note that the gear ratios of the first gear 26 and the second gear 27 may be set to be different from each other, or both the gear ratios of the first gear 26 and the second gear 27 and the gear the gear ratios of the third gear 28 and the fourth gear 29 may be set to be different from each other.

In this manner, it is possible to set the rotation speed of the throttle shaft 15 in the second throttle unit 12 used for the cylinders 2c and 2d that are subjected to cylinder deactivation in the cylinder deactivated operation to be higher than the rotation speed of the throttle shaft 15 in the first throttle unit 11 used for the cylinders 2a and 2b that are not subjected to cylinder deactivation even when the rotation speeds of rotation drive axes 24 of the motors 17 are the same in the first throttle unit 11 and the second throttle unit 12.

Figure 6:
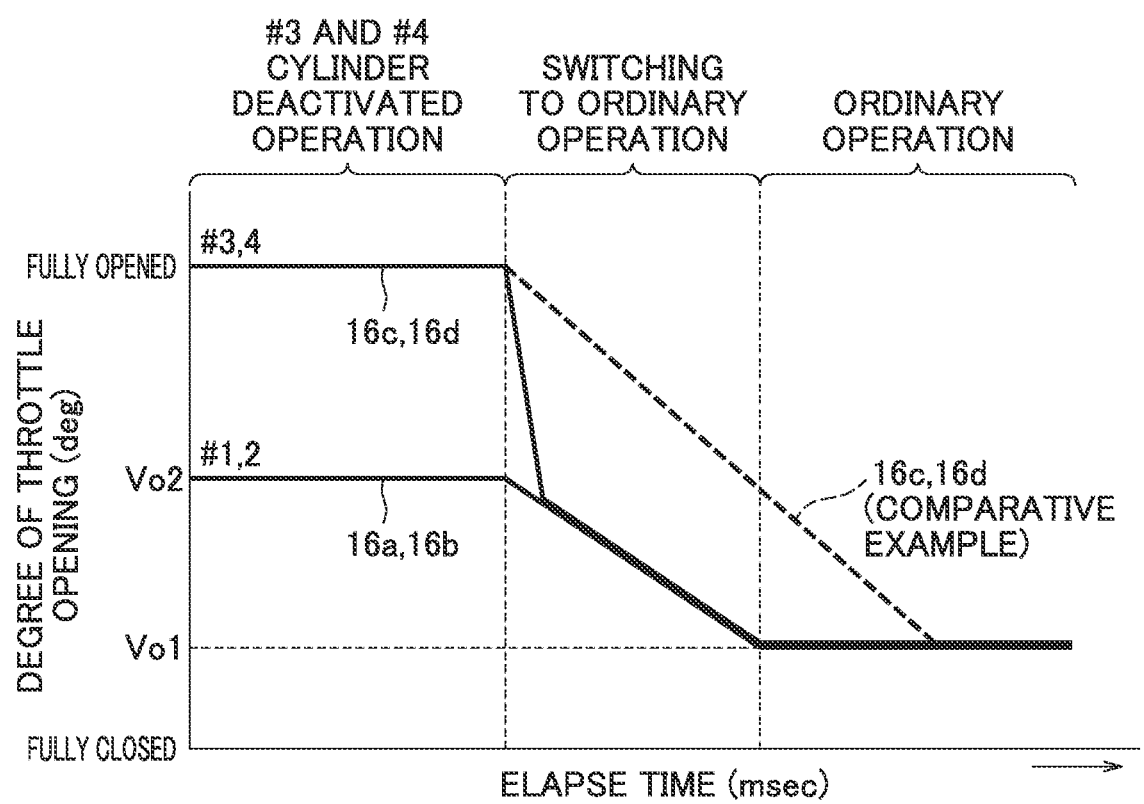
FIG. 6 is a graph illustrating a transition example of a degree of throttle opening at the time of shifting from a cylinder deactivated operation to an ordinary operation.

FIG. 6 is a graph illustrating a transition example of a degree of throttle opening at the time of transition from the cylinder deactivated operation to the ordinary operation. FIG. 6 illustrates transition of the degrees of opening of the throttle valves 16a, 16b, 16c, and 16d until the degrees of opening of the throttle valves 16a, 16b, 16c, and 16d transition to a predetermined degree of opening Vo1 when the cylinder deactivated operation is released from the cylinder deactivated operation state and transition to the ordinary operation is achieved. Note that FIG. 6 illustrates a case in which a requested output of the engine slightly increases from the cylinder deactivated operation state and transitions to the ordinary operation in which combustion is carried out in all the cylinders 2a to 2d is achieved. Note that in order to avoid large variation in the output of the entire engine 1, when the requested output of the engine 1 slightly increases from the cylinder deactivated operation state and switching to the ordinary operation is achieved, the degree of opening (predetermined degree of opening Vo2) of the throttle valves 16a and 16b in the cylinder deactivated operation state is greater than the degree of opening (predetermined degree of opening Vo1) of the throttle valves 16a, 16b, 16c, and 16d in the ordinary operation.

As illustrated in FIG. 6, the degree of opening of the throttle valves 16a and 16b in the first throttle unit 11 is the degree of throttle opening Vo2 corresponding to the requested output based on an accelerator operation or the like while the degree of opening of the throttle valves 16b and 16d in the second throttle unit 12 is a fully opened state. Also, in a case in which an operation of opening the accelerator is performed, a requested output increases, and the cylinder deactivated operation is released, for example, motors 17 are controlled respectively to achieve the ordinary operation in which all the throttle valves 16a to 16d have the requested degree of opening Vo1 based on the accelerator operation or the like.

Here, in a case in which the deceleration ratio of the deceleration mechanism 45 in the second throttle unit 12 is the same as the deceleration ratio of the deceleration mechanism 20 in the first throttle unit 11 in a comparative example, the degree of opening of the throttle valves 16c and 16d in the second throttle unit 12 and the degree of opening (represented by the thin solid line in FIG. 6) of the throttle valves 16a and 16b in the first throttle unit 11 transition at an equivalent speed as represented by the dashed line in FIG. 6. Thus, a period of time during which the degree of opening of the throttle valves 16c and 16d does not reach the predetermined degree of opening Vo1 occurs even when the degree of opening of the throttle valves 16a and 16b reaches the predetermined degree of opening Vo1. Thus, there is a possibility that the degrees of opening of the throttle valves 16a and 16b and of the throttle valves 16c and 16d do not conform to each other over the entire period of time of the switching from the cylinder deactivated operation to the ordinary operation and immediately after the transition from the cylinder deactivated operation to the ordinary operation and the driver has an uncomfortable feeling from the output of the engine 1 due to a difference in output of the #1 and #2 cylinders 2a and 2b and the #3 and #4 cylinders 2c and 2d.

On the other hand, since the deceleration ratio of the deceleration mechanism 45 in the second throttle unit 12 is smaller than the deceleration ratio of the deceleration mechanism 20 in the first throttle unit 11 in this embodiment, the degree of opening of the throttle valves 16c and 16d conforms to the degree of opening of the throttle valves 16*a* and 16*b* before the degree of opening of the throttle valves 16*a* and 16*b* in the first throttle unit 11 reaches the predetermined degree of opening Vo1 as represented by the thick solid line in FIG. 6. Note that each motor 17 may be controlled such that the transition is carried out with the degree of opening of the throttle valves 16*c* and 16*d* and the degree of opening of the throttle valves 16*a* and 16*b* maintained to conform to each other, until the predetermined degree of opening Vo1 is reached after the degree of opening of the throttle valves 16*c* and 16*d* and the degree of opening of the throttle valves 16*a* and 16*b* conform to each other.

Since the degree of opening of the throttle valves 16*a* and 16*b* in the first throttle unit 11 thus conforms to the degree of opening of the throttle valves 16*c* and 16*d* in the second throttle unit 12 in an early stage when the transition from the cylinder deactivated operation to the ordinary operation is achieved in this embodiment, it is possible to quickly cause the outputs of the #1 and #2 cylinders 2*a* and 2*b* to conform to the outputs of the #3 and #4 cylinders 2*c* and 2*d*, to smooth the output of the engine, and thereby to improve an output feeling of the engine 1.

As described above, the throttle device 10 according to the present embodiment is the multi-throttle device 10 provided with the throttle valves 16*a* to 16*d* in the intake air passages 13*a* to 13*d* of the four cylinders 2*a* to 2*d* in the engine 1 and includes the two throttle units 11 and 12. The throttle device 10 has a structure in which the motor 17 included in the first throttle unit 11 drives the two throttle valves 16*a* and 16*b* while the motor 17 included in the second throttle unit 12 drives the two throttle valves 16*a* and 16*b*.

Also, the deceleration mechanism 20 of the first throttle unit 11 and the deceleration mechanism 45 of the second throttle unit 12 are set to have different deceleration ratio from each other in the present embodiment.

In this manner, it is possible to cause the throttle valves 16*a* and 16*b* in the first throttle unit 11 and the throttle valves 16*c* and 16*d* in the second throttle unit 12 to have different responsiveness to valve opening degree control with a simple configuration by setting the deceleration mechanism 20 and the deceleration mechanism 45 to have different deceleration ratio from each other.

Further, the engine 1 according to the present embodiment include the cylinder deactivated operation function and changes the degree of opening of the throttle valve 16*b* in the second throttle unit 12 corresponding to a part of the four cylinders 2*a* to 2*d*, namely the cylinders 2*c* and 2*d* into a fully opened state at the time of a low requested output.

Since the deceleration ratio of the deceleration mechanism 45 in the second throttle unit 12 that are operated in the fully opened state in the cylinder deactivated operation function is set to be smaller than the deceleration ratio of the deceleration mechanism 20 in the first throttle unit 11 in which the cylinder deactivation is not performed in the cylinder deactivated operation to obtain a specification that the return spring 21 in the second throttle unit 12 has in the present embodiment, it is possible to curb an uncomfortable feeling of the output of the engine 1 with a simple configuration by quickly lowering the degree of opening of the throttle valves 16*c* and 16*d* in the second throttle unit 12 to the same degree of opening as that of the throttle valves 16*a* and 16*b* in the first throttle unit 11 when the cylinder deactivated operation is released.

Also, the deceleration mechanisms 20 and 45 according to the aforementioned embodiment may have a structure in which the set torque of the return spring 21 can be changed.

The set torque of the return spring 21 is a biasing torque caused by the return spring 21 toward a closed direction in a closed state of the throttle valves 16*a* to 16*d*.

Figure 7:
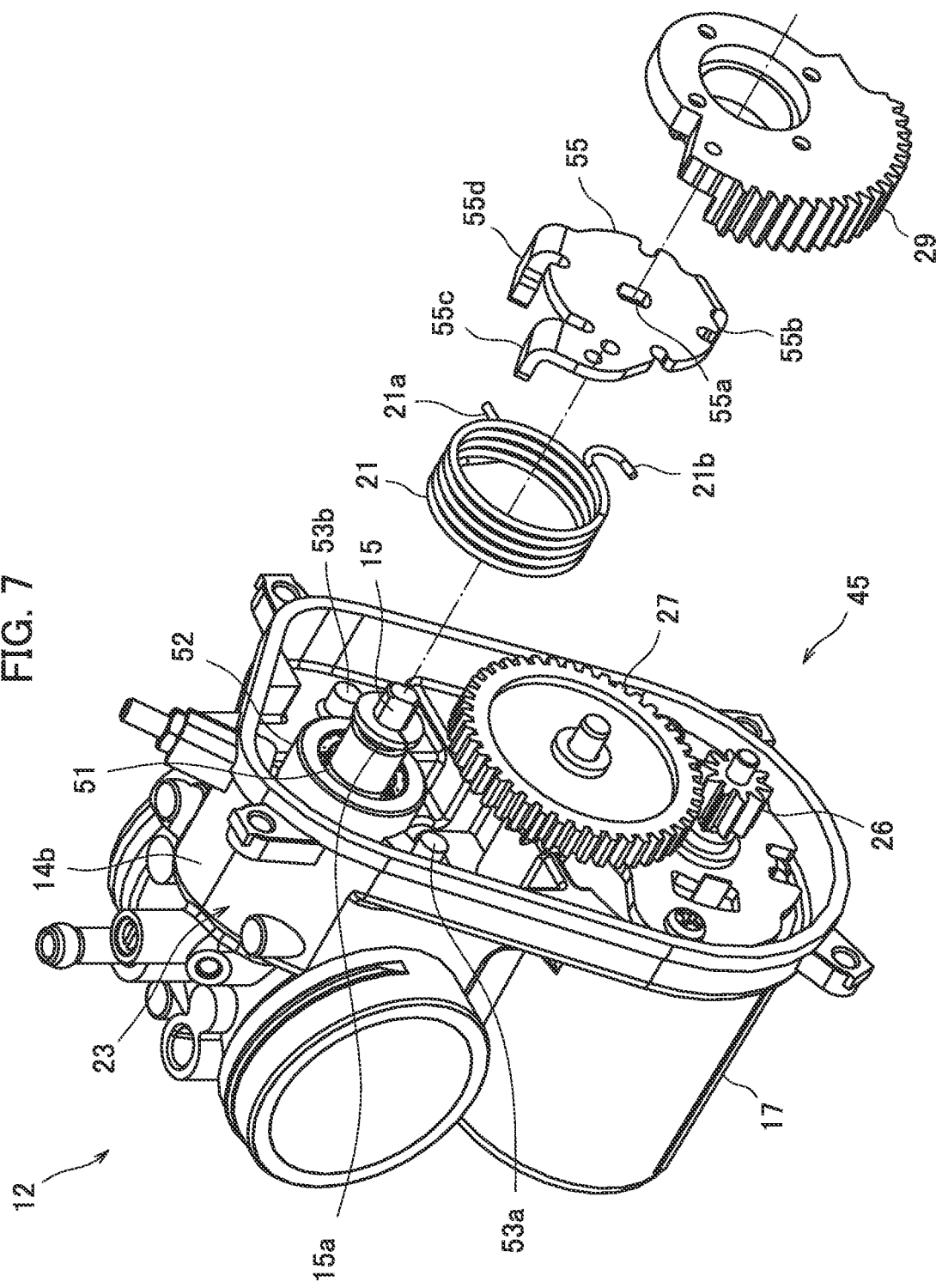
FIG. 7 is an assembly diagram of an attachment portion of a return spring in the second throttle unit.
Figure 8:
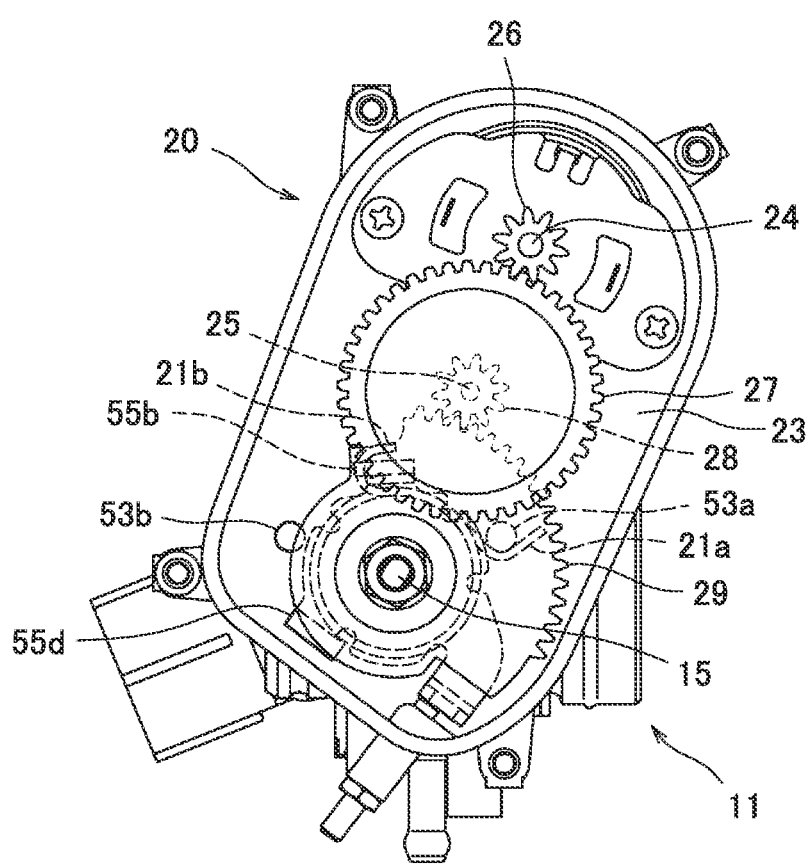
FIG. 8 is an explanatory diagram illustrating an installation state of the return spring in a first throttle unit.
Figure 9:
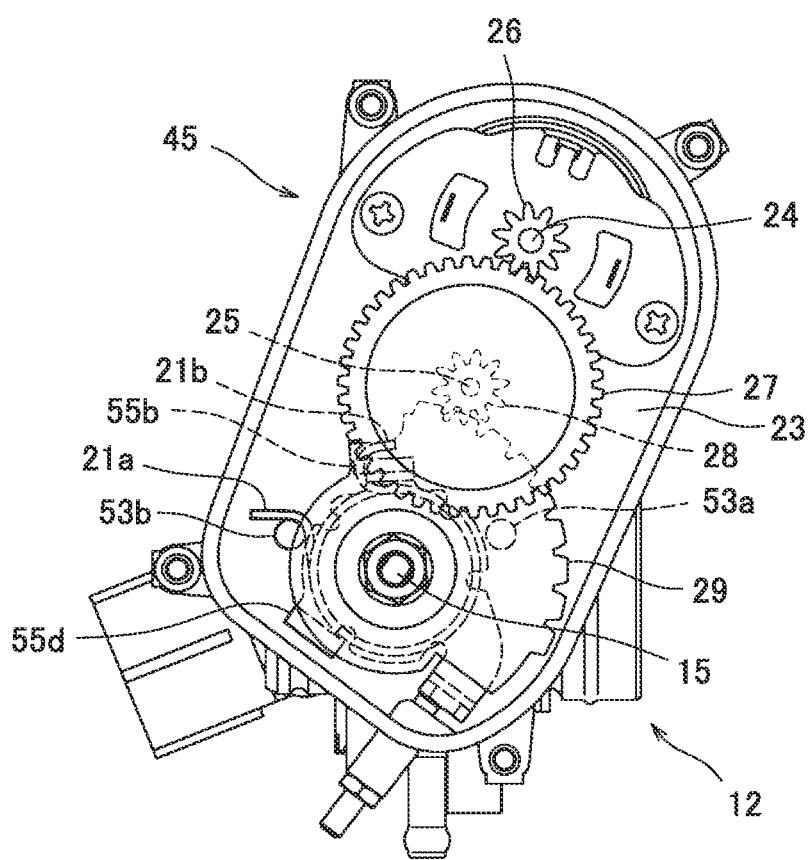
FIG. 9 is an explanatory diagram illustrating an installation state of the return spring in a second throttle unit.

FIG. 7 is an assembly diagram of an attachment portion of the return spring 21 in the second throttle unit 12. FIG. 8 is an explanatory diagram illustrating an installation state of the return spring 21 in the first throttle unit 11. FIG. 9 is an explanatory diagram illustrating an installation state of the return spring 21 in the second throttle unit 12. Note that the up-down direction in FIG. 7 is opposite of that in FIGS. 1 to 4, 8, and 9 for easiness in viewing the attachment portion of the return spring 21, and the throttle shaft 15 is illustrated above the motor 17. Although the first throttle unit 11 and the second throttle unit 12 are laterally symmetric, on the left and right sides, the first throttle unit 11 and the second throttle unit 12 are illustrated in a left-side-right manner in FIG. 8 for easy comparison therebetween.

As illustrated in FIG. 7, a cylindrical rib 52 projecting outward in the axial line direction of an insertion hole 51, into which the throttle shaft 15 is inserted, is formed around the insertion hole 51 at an end portion of the unit body 23 (specifically, an end portion of the second segment body 14*b* on the side of the deceleration mechanism 45). Also, two projections (a first projection 53*a* and a second projection 53*b*) are formed outward in the radial direction of the rib 52 at the end portion of the second segment body 14*b*. The first projection 53*a* and the second projection 53*b* have columnar shapes with a diameter of about several mm, for example, project outward in the axial line direction of the insertion hole 51 in parallel with the rib 52, and project up to the vicinity of the distal end of the rib 52. The first projection 53*a* and the second projection 53*b* are disposed at mutually opposite positions with the insertion hole 51 sandwiched therebetween, for example, at an interval from each other in the circumferential direction on a concentric circle around the insertion hole 51 at the center.

Both end portions 21*a* and 21*b* of the return spring 21 project outward in the radial direction. The return spring 21 is configured to be disposed with the distal end portion of the rib 52 inserted thereinto such that the end portion 21*a* on the second segment body 14*b* can be locked at the first projection 53*a* and the second projection 53*b*.

The fourth gear 29 and the throttle shaft 15 are secured to each other via a disk-shaped hook plate 55. A shaft coupling hole 55*a* into which the throttle shaft 15 is inserted is provided at the center of the hook plate 55. The distal end portions of the shaft coupling hole 55*a* and the throttle shaft 15 are formed into rectangular shapes, for example, and the throttle shaft 15 and the hook plate 55 are coupled so as not to be able to rotate relative to each other, that is, such that the rotation of the fourth gear 29 is transmitted to the throttle shaft 15.

A step difference 15*a* positioning the hook plate 55 in the axial direction is provided at the distal end portion of the throttle shaft 15. The return spring 21 is disposed between the hook plate 55 disposed with the distal end portion of the throttle shaft 15 inserted thereinto and the second segment body 14*b*. The fourth gear 29 is secured to the outside of the hook plate 55 with a plurality of bolts, for example.

A first hook 55*b*, a second hook 55*d*, and a stopper 55*c* extending outward in the radial direction with distal ends bent toward the axial direction (on the side of the second segment body 14*b*) are formed at outer peripheral end portions of the hook plate 55. The first hook 55*b* and the second hook 55*d* are disposed at an interval from each other in the circumferential direction on a concentric circle around the shaft coupling hole 55*a* at the center. Also, grooves, for example, are formed in both the first hook 55b and the second hook 55d for easily locking the end portion 21b of the return spring 21.

The stopper 56c abuts on a stopper bolt 56 provided in the second segment body 14b to prevent rotation of the throttle shaft 15 in one direction (right rotation in FIG. 7). The stopper bolt 56 can adjust the position at which the stopper bolt 56 abuts on the stopper 55c.

The return spring 21 biases the hook plate 55 in the one rotation direction (right rotation in FIG. 7) relative to the second segment body 14b, and the rotation thereof is prevented at a predetermined rotation position by the stopper 55c. In other words, the throttle shaft 15 is biased to rotate relative to the unit body 23 by a biasing force of the return spring 21. In this manner, the throttle valves 16c and 16d (16a and 16b in the first throttle unit 11) are closed when the motor 17 does not operate.

Also, the fourth gear 29 rotates against the biasing of the return spring 21 (left rotation in FIG. 7) via the deceleration mechanism 45 by operating the motor 17.

In the deceleration mechanisms 20 and 45 according to this embodiment, the projections 53a and 53b are provided at two locations of the second segment body 14b, and the end portion 21a of the return spring 21 on the side of the second segment body 14b can be selectively locked at any of these projections 53a and 53b. The throttle valves 16c and 16d (16a and 16b) are biased in the closed direction by biasing of the return spring 21, and the throttle valves 16c and 16d (16a and 16b) are brought into a closed state when the motor 17 does not operate. The biasing torque of the return spring 21 in the closed state, that is, the set torque maintaining the throttle valves 16c and 16d (16a and 16b) in the closed state is defined by the locking position of the end portion 21a of the return spring 21.

As illustrated in FIG. 8, the set torque is set to be relatively small by locking the end portion 21a of the return spring 21 at the first projection 53a in the first throttle unit 11.

As illustrated in FIG. 9, the set torque is set to be relatively large by locking the end portion 21a of the return spring 21 at the second projection 53b in the second throttle unit 12.

Also, the first hook 55b and the second hook 55d are formed in the hook plate 55, and the set torque can also be changed depending of which of the first hook 55b and the second hook 55d the end portion 21b of the return spring 21 is locked at.

The set torque is set to be relatively small by locking the end portion 21b of the return spring 21 at the first hook 55b in the first throttle unit 11.

The set torque is set to be relatively large by locking the end portion 21b of the return spring 21 at the second hook 55d in the second throttle unit 12.

It is thus possible to cause the throttle valves 16c and 16d in the second throttle unit 12 that is subjected to cylinder deactivation to further quickly perform the closing operation as compared with the throttle valves 16a and 16b in the first throttle unit 11 that is not subjected to cylinder deactivation when the throttle valves 16a to 16d in the first throttle unit 11 and the second throttle unit 12 are operated from the fully opened state to the fully closed state.

Although the description of the embodiments will now end, the aspects of the present invention are not limited to the aforementioned embodiments. For example, although the present invention is applied to the engine 1 provided with the cylinder deactivated function in the aforementioned embodiments, the present invention may be applied to an engine with no cylinder deactivated function.

It is possible to immediately solve differences in degrees of opening of a plurality of throttle valves in a case in which control is performed to obtain the same degree of opening from the state in which the degrees of opening differ from each other, in an engine in which a state where the degrees of opening of the plurality of throttle valves differ from each other may occur regardless of the engine being not provided with the cylinder deactivated operation function. It is thus possible to achieve smooth operations of the engine with a simple configuration.

Although the present invention is applied to the throttle device 10 in the four-cylinder engine 1 in the embodiments, the present invention may be applied to a throttle device for an engine with a plurality of cylinders instead of the four-cylinder engine.

Although the throttle device 10 according to the embodiment has the two throttle units 11 and 12, and the total of two motors 17 for each two of the four cylinders drive the throttle valves for the cylinders, the throttle device may include three or more motors. The number of throttle valves operated by each motor may be any number instead of two.

The throttle device according to the present invention can be employed for an engine used for applications other than the motorcycle.

The present invention is employed in a multi-cylinder engine and can widely be applied to a throttle device in which a plurality of motors share operations of opening and closing a plurality of throttle valves.

What is claimed is:

1. A throttle device comprising:
a plurality of throttle units provided in an engine for each of cylinders or for each of cylinder groups, each of the throttle units including
a throttle body having intake air passages corresponding to the plurality of cylinders of the engine,
a throttle shaft rotatably supported by the throttle body,
throttle valves secured to the throttle shaft to open and close the intake air passages for the cylinders,
a motor, and
a decelerator decelerating rotation of a drive shaft of the motor and transmitting the decelerated rotation to the throttle shaft,
wherein a cylinder deactivation control unit stopping operations of the motor of a second throttle unit out of the plurality of throttle units to cause the throttle valves of the second throttle unit to have a predetermined degree of opening in a predetermined operation region of the engine and deactivating combustion of the cylinders or the cylinder groups corresponding to the second throttle unit, and
a deceleration ratio of the decelerator in the second throttle unit is lower than the deceleration ratio of the decelerator in a first throttle unit out of the plurality of throttle units.

2. The throttle device according to claim 1, wherein the predetermined degree of opening is fully opened state.

3. The throttle device according to claim 1, wherein two units being the throttle units are provided in the engine.

4. The throttle device according to claim 2, wherein two units being the throttle units are provided in the engine.

5. The throttle device according to claim 1, wherein the throttle device is provided in the engine of a motorcycle.

6. The throttle device according to claim 2, wherein the throttle device is provided in the engine of a motorcycle.

7. The throttle device according to claim 3, wherein the throttle device is provided in the engine of a motorcycle.

8. The throttle device according to claim 4, wherein the throttle device is provided in the engine of a motorcycle.

* * * * *